Figure 1:
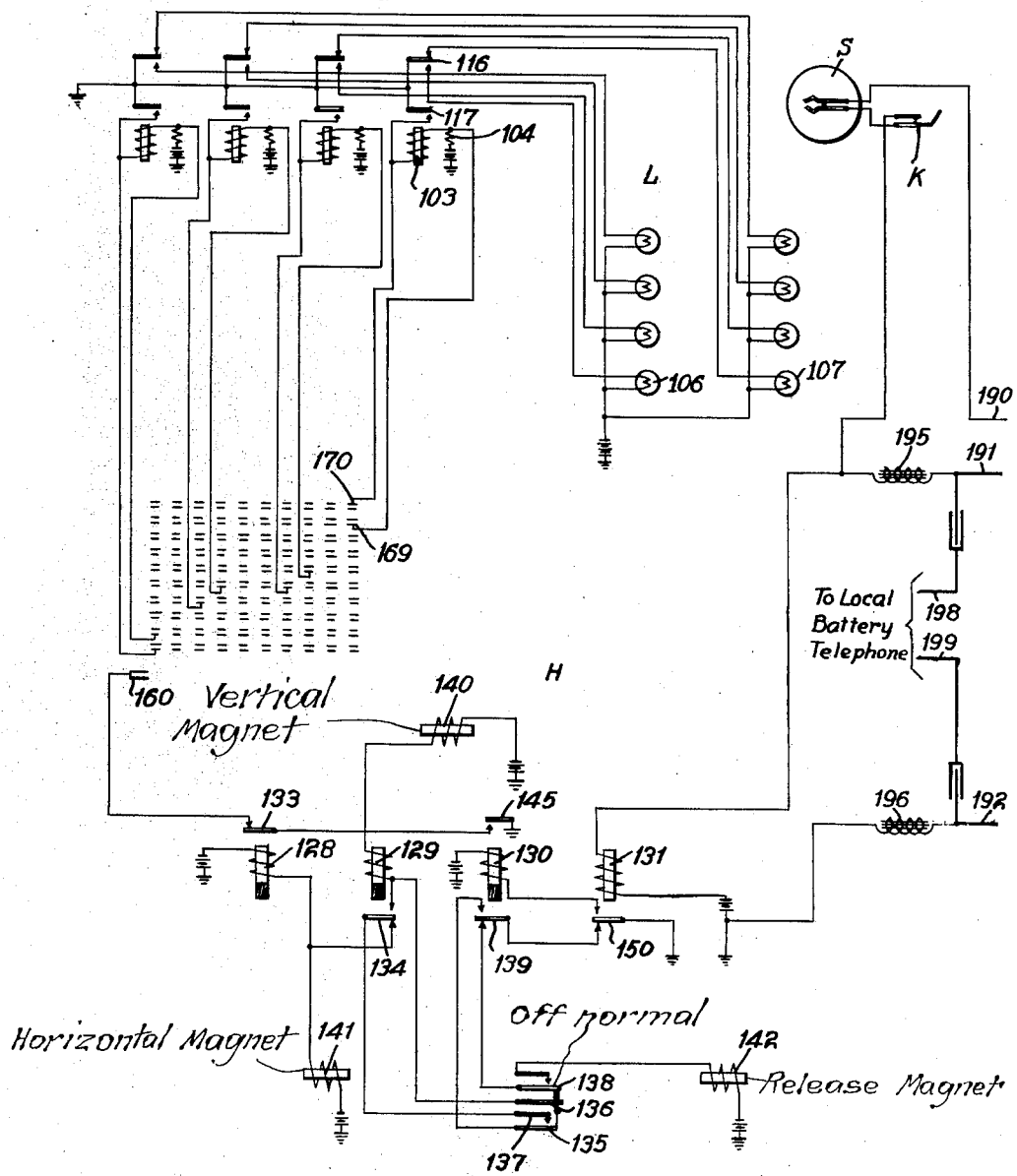

INVENTOR
Roy J. Wensley.

Patented Dec. 24, 1929

1,740,485

UNITED STATES PATENT OFFICE

ROY J. WENSLEY, OF EDGEWOOD, PENNSYLVANIA, ASSIGNOR TO WESTINGHOUSE ELECTRIC & MANUFACTURING COMPANY, A CORPORATION OF PENNSYLVANIA

SUPERVISORY CONTROL SYSTEM

Application filed April 16, 1923. Serial No. 632,593.

My invention relates, in general, to systems for supervising and controlling from a remote point the operation of electrical equipment, such as the equipment found in automatic power substations.

In automatic substations, the need for personal supervision is, to a large extent, eliminated. However, the elimination of the personal element carries with it some disadvantage, inasmuch, as it often occurs, that, at certain times, the load will fluctuate rapidly to cause the frequent shutting down and restarting of the substation. Obviously, under these conditions, it is desirable to maintain the station in operation.

In addition, the complete automatic control of a substation is inflexible for the reason that it does not allow varying operations to meet emergency conditions. Such operations are necessarily fixed since they are fully automatic. In view of the fact, that, in an abnormal period, conditions are present which are radically different from the ordinary working conditions, it is difficult to provide automatic equipment to cope with them. It is the object of this invention to provide simple and efficient apparatus for supervising and controlling the equipment in an automatic substation from a remote point or control station. In systems where there are a number of automatic stations, the supervisory and controlling equipment for all automatic stations may be placed in a central control station or dispatcher's office, which may be located at some distance from all the stations.

In accordance with the present invention, supervisory equipment is provided at the control station for indicating the condition of apparatus units at the substations. A three-wire trunk connects each substation with the control station. Associated with each end of the trunk is an automatic connector switch, of a type well known in the automatic telephone field. There is also associated with the trunk, at each substation, an automatic finder switch. In the control or dispatcher's office, an automatic calling device of well known construction is provided.

Briefly, the operation is as follows: When one of the apparatus units at the substation changes its condition, under automatic control, the automatic finder switch is operated to find the apparatus unit operated. A code of impulses is then sent over the trunk line to operate the automatic connector switch in the control office. The operation of this switch lights a supervisory signal before the dispatcher, notifying him of the operation of the apparatus unit. To effect the operation of an apparatus unit in any substation, the dispatcher has merely to operate a key, which associates his calling device with the trunk line leading to that particular substation, and then to operate the device in accordance with the actuating code of the unit. As a result of these actions, the connector switch associated with the trunk line in the substation is operated to initiate the operation of the apparatus unit.

In the above-described manner, it is possible to effect a large number of operations at the substation.

According to another feature of the invention, there is provided an arrangement for rendering the automatic control equipment at the substation ineffective in the event that the dispatcher initiates its operation.

Another feature of the invention relates to the provision of visual indicating means for notifying the dispatcher of changes in voltage across the supply busses at the substation.

There are other objects of the invention, which, together with the foregoing, will be described hereinafter with reference to the accompanying drawings.

Referring now to the drawings, Figures 1, 2, 3 and 4 are conventional diagrams of circuits and sufficient of the apparatus to enable the invention to be readily explained and understood.

While, in the drawings, a plurality of batteries have been shown having their positive poles connected to ground, it will be understood that there will be, preferably, one battery at each substation and one battery in the control office, and it will be understood further that, in the majority of cases, these batteries will be ungrounded and metallic circuits will be provided in place of the grounded circuits, which have been shown for the sake of simplicity.

Referring now more particularly to Fig. 1, at RG is shown a relay group for controlling the operation of the bank of lamps indicated at L. The connector switch H is an automatic switch of the well known Strowger construction having a vertical group selecting movement and a rotary line selecting movement as shown in Aitken's "Automatic Telephone Systems" Vol. 1, "Strowger System Section". The calling device S is of the ordinary automatic two-wire type, shown in Aitken's "Automatic Telephone Systems" Vol. 1, "Dial Impulse Senders Section", and is adapted to be associated with the trunk line comprising conductors 190 to 192, inclusive, by means of the key K.

Figure 2:
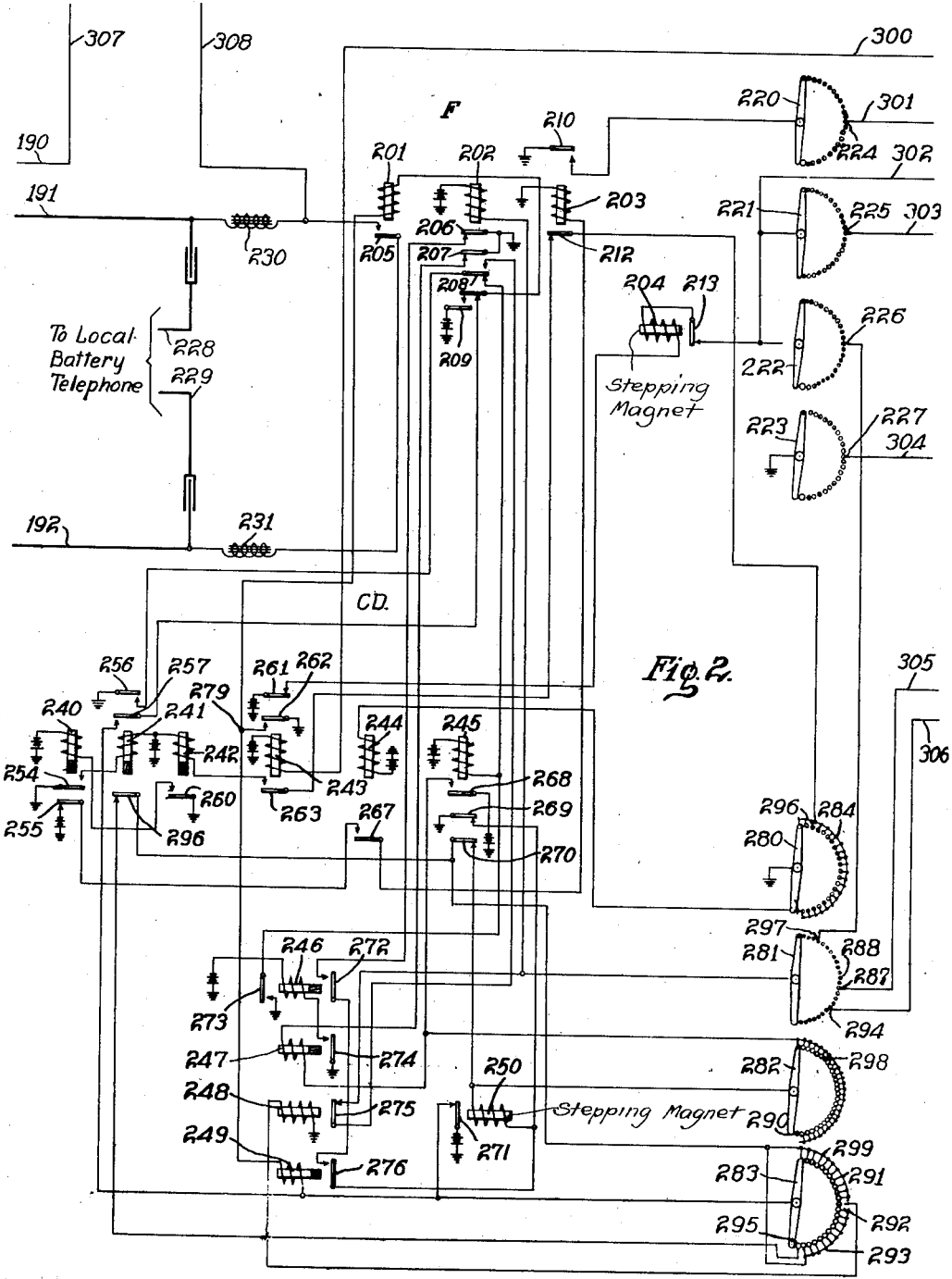

In Fig. 2 is shown a portion of the equipment for controlling the connector switch H at the control or dispatcher's office, in Fig. 1. This equipment comprises a finder switch F and a code-sending switch CD as shown in Aitken's "Automatic Telephony" Vol. 1, "Machine Switching Section". The finder switch F is of the ordinary rotary type, the wipers of which move in a forward direction only. The switch is provided with four wipers, each of which is adapted to engage a contact bank made up of twenty-five contacts. The wipers of the finder switch have no normal position. The code-sending switch CD is similar to the finder switch F in mechanical construction. By reason of the differences in circuit design, made necessary by the different functions that the switches have to perform, the wipers of the switch CD are restored to normal after the sending of each code.

The conductors 198 and 199 in Fig. 1 and the conductors 228 and 229 in Fig. 2 each extend to ordinary local battery telephones provided with hand generators for signalling purposes.

Figure 3:
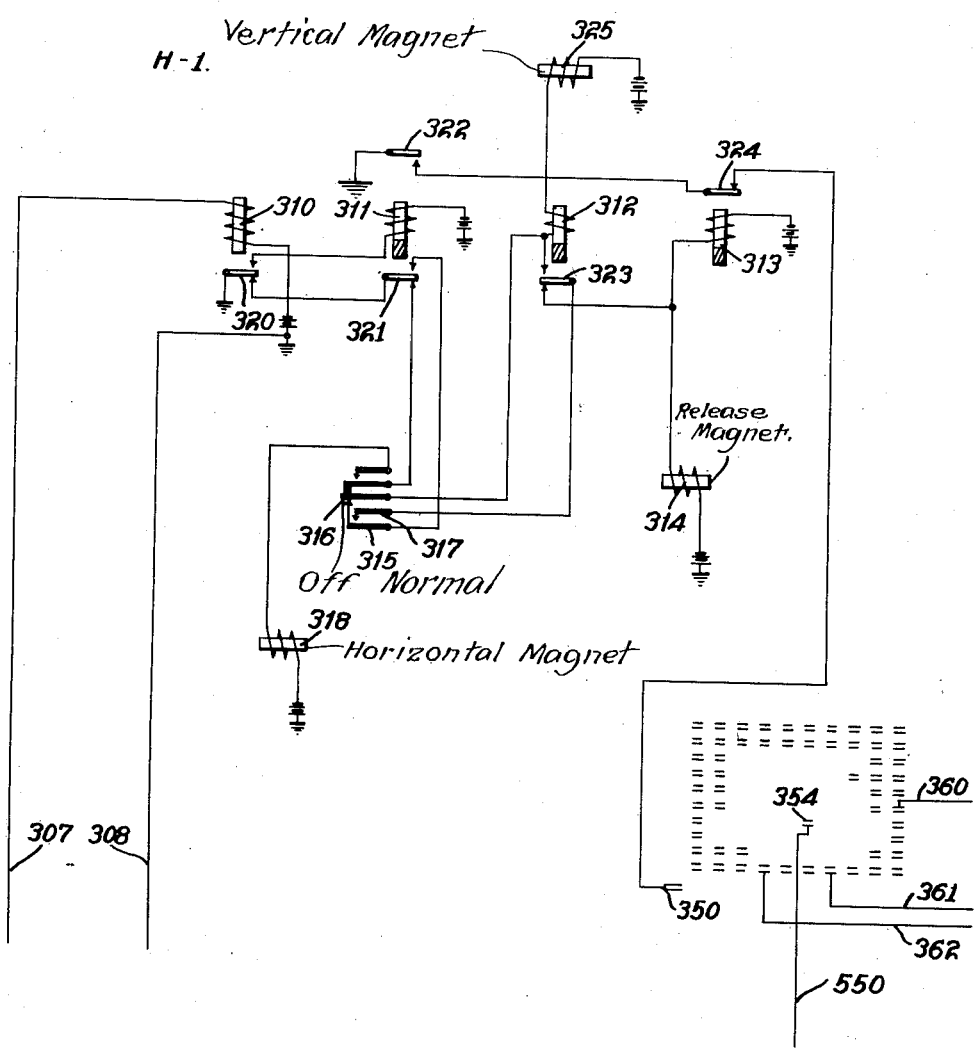

In Fig. 3 is shown an automatic connector switch H—1. This switch is associated with the trunk line extending between the control station and the automatic substation and is similar to the connector switch H, shown in Fig. 1, and already described.

Figure 4:
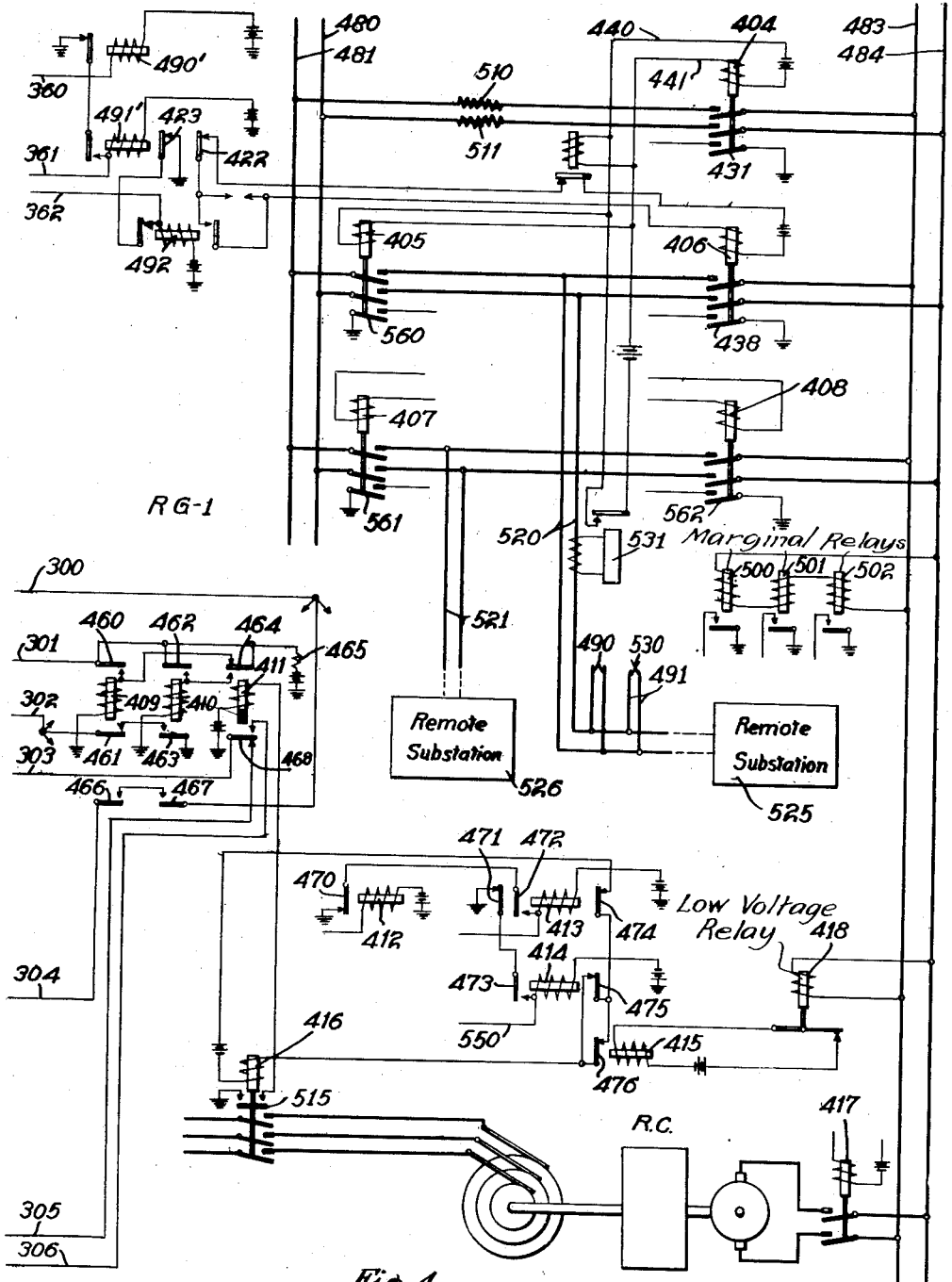

Fig. 4 shows a portion of the equipment in the automatic substation and certain controlling relays. The rotary converter RC is supplied with three-phase alternating-current from a suitable source (not shown) through a contactor 416. The converter is connected to a main bus 483, 484 through a contactor 417. The main bus is connected through contactors 406 and 408, respectively, to tie feeders 520 and 521 extending to other substations 525 and 526. Tapped off the feeders 520 are the feeders 490 and 491 extending to the third rail or trolley of the traction system. It is the usual practice to ground one side of the main bus in a direct-current system of this kind, but for the sake of simplicity, metallic circuits are shown.

It will be understood that the rotary converter, and the bus and feeder contactors shown in Fig. 4, are normally controlled automatically in accordance with the load on the substation. Only so much of the automatic controlling equipment is shown as is necessary for a clear understanding of the invention. Various arrangements are known and can be used for this purpose. An electro-responsive device 418, which may be a contact-making voltmeter, is connected across the main bus 483, 484. The voltage on this bus varies depending upon the load on the station. As long as this voltage is sufficiently high, the contacts of the electro-responsive device 418 are held open.

It will be assumed that the rotary converter RC is inoperative, the load being carried by the other substations. If a car approaches the substation, the voltage upon the bus 483, 484 will drop and the electro-responsive device 418 will close its contact, whereupon the master relay 415 will be energized. Upon the energization of relay 415, a circuit is closed through the armature 476 and its front contact to energize the contactor 416. The contactor 416 is operated to start the rotary converter RC by connecting the same to a source of energy.

In actual practice, the energization of the master relay 415 initiates the operation of controlling devices (not shown) to perform various other functions required in starting the converter and connecting it to the main bus, such as raising all but two of the direct-current brushes from engagement with the commutator, correcting the polarity of the converter if it is incorrect, connecting running voltage to the converter when it has attained its correct speed, closing the contactor 417 to connect the converter to the direct-current bus, and the like. The cooperation of the automatic control with the remote control, according to the present invention, will be clear without a detailed disclosure of the specific means for accomplishing these functions.

Whenever the contactor 416 is operated, a circuit is closed for a relay 411. The relay 411 is one of a group of relays which is associated with each apparatus unit to be supervised. These groups of relays indirectly control the supervisory equipment of the dispatcher. The operation of the relay 411 serves to apprise the dispatcher by initiating the operation of supervisory signals of the condition of the contactor 416. All the contactors and other pieces of apparatus at the substation are provided with similar contacts or with contacts controlled in any suitable manner for sending supervisory signals. Thus, the contactors 404 to 408, inclusive, are provided with similar contacts 431, 560, 438, 561 and 562, respectively.

To illustrate a condition that may arise wherein the invention is particularly useful, some other substation circuits have been shown in detail. An auxiliary bus 480, 481 is connected to the main bus through a contactor 404 and the current-limiting resistors 510 and 511 and to the auxiliary busses 520 and 521 through the contactors 405 and 407, respectively. To indicate the general operation, it will be assumed that a short-circuit occurs upon one of the feeders 491, as indicated at 530. This short-circuit, if near the substation, may draw an excessively large current from the converter RC. It is desirable, however, to attempt to burn out the short-circuit without shutting down the substation. To avoid injury to the converter, the resistors 510 and 511 are inserted in this defective feeder. This is done automatically by the current-responsive device 531, which operates in a well known manner immediately after the short-circuit occurs, to open a contactor 406 and to close the contactors 404 and 405. The defective feeder is now fed from the auxiliary bus 480, 481 through the contactor 405, the auxiliary bus being connected to the main bus through the current-limiting resistors 510 and 511.

The dispatcher is apprised of the overloaded condition of the substation and the operation of the contactors 405, 404 and 406 by his supervisory apparatus. If the short-circuit continues to exist for any appreciable length of time, it is desirable to relieve the substation of a portion of the load and to disconnect the current-limiting resistors 510 and 511, as the energy dissipating capacity of these resistors is limited from practical considerations.

Both of the above-mentioned objects are obtained by opening the contactor 408, closing the contactor 407 and opening the contactor 404, these operations being performed by the dispatcher, as more fully explained below. The short-circuit is now fed from the substation 526 through the tie feeder 521 and the contactors 407 and 405, it being assumed that the substation 526 is not overloaded. The resistance of the tie feeder 521, which may be of considerable length, limits the current in exactly the same manner as did the resistors 510 and 511. Where there are a number of substations like 526 and 525, the dispatcher may select one or more substations which are not heavily loaded for supplying the current to burn out the short-circuit.

The apparatus shown in the drawings having been described briefly, its detailed operation will now be considered. It will be remembered that the operation of the contactor 416, described above, closes a circuit for the slow releasing relay 411. The relay 411 is energized from this circuit, and, upon operating, completes a circuit at its armature 464 for energizing the relay 410.

When the relay 411 was in a deenergized condition, a relay 409 was energized to establish a locking circuit for itself at its armature 460 and to prepare a circuit, at its armature 461, for a stepping magnet 204 of the finder switch F.

When the relay 410 is energized, a circuit is completed, which extends from ground, by way of the armature 463 and its front contact, the front contact and the armature 461 of relay 409, a common conductor 302, the back contact and the armature 213 of the stepping magnet 204, through the winding of the stepping magnet 204, the back contact and the armature 261 of relay 243, and thence to battery. The stepping magnet 204 is energized from this circuit and, as it interrupts its own circuit at its armature 213, rotates the wipers 220 to 223, inclusive, step by step, until these wipers are brought into engagement with bank contacts 224 to 227, inclusive, which are the contacts associated with contactor 416 which controls the rotary converter RC in the bank of the finder switch F.

When the switch wipers are brought into engagement with this set of bank contacts, a circuit is completed extending from ground by way of the wiper 223, the bank contact 227, a conductor 304, the armature 466 of the relay 409, and its front contact, the front contact and the armature 467 of the relay 410, a common conductor 300, and through the winding of the relay 243 of the code-sending switch CD to the battery. The relay 243 is energized from this circuit and, on attracting its armatures, opens the circuit of the stepping magnet 204 at its armature 261, closes a circuit extending from ground by way of the armature 262 and its front contact to a junction point 279. At the point 279 the circuit divides, one path extending by way of the winding of a relay 249, the back contact and armature 271 of a stepping magnet 250 to battery. The other path will be traced later. Further results of the energization of relay 243 are that at its armature 263 a circuit is completed, which extends from ground by way of the wiper 280 in engagement with its first bank contact, the armature 212 and its back contact, the armature 263 and its front contact, and through the winding of the relay 242 to the battery.

The relay 242 is energized over the above traced circuit and, at its armature 260 and front contact, completes a circuit for the slow releasing relay 240. The relay 240, upon being energized, closes a circuit at armature 254 for energizing a slow releasing relay 241.

The relay 241, upon being energized, completes a circuit extending from ground by way of the armature 256 and its front contact, the armature 208 and its back contact, and through the winding of the relay 245 to battery, and through its armature 257 completes a circuit extending from battery by way of the armature 271 and its back contact, the front contact and the armature 257, through the normally closed springs controlled by the armature 209, through the winding of the relay 201, and thence to ground by way of the armature 262 and its front contact. Relay 245 is energized over the above traced circuit and, upon being operated, completes a circuit extending from battery by way of armature 268 and its front contact, through the winding of the slow releasing relay 247 and thence to ground by way of the back contact and the armature 207. Upon operating the relay 247, its armature 274 causes relay 246 to be energized and, when relay 246 is energized, its armature 273 closes another circuit for the relay 245. A further result of energizing relay 246 is that at armature 272 a circuit is closed which extends from ground by way of the armature 206 and its back contact, the front contact and the armature 272, the front contact and the armature 276, through the winding of the stepping magnet 250, the wiper 282 and its associated bank contact, and thence to battery, by way of the front contact and the armature 268. The magnet 250, upon being energized, causes its armature 271 to open the circuit of the repeating relay 201 and also the circuit of the slow releasing relay 249.

When the circuit of the repeating relay 201 is completed, a circuit is closed by the operation of armature 205 for the line relay 131 of the connector switch H in the control office. The relay 131, upon operating, closes a circuit for the slow releasing relay 130 at an armature 150. The relay 130, upon operating, at its armature 139 opens one point in the circuit of a release magnet, 142, at the front contact of this armature prepares an impulsing circuit for the connector H, and at armature 145 places ground upon the wiper 160.

It will be seen that the circuit of the relay 201 is opened by the energization of the stepping magnet 250. Upon the relay 201 retracting its armature 205, the circuit of the line relay 131 of the connector switch H is opened and this relay is deenergized. The deenergization of the line relay 131 opens the circuit of the slow releasing relay 130 at the armature 150 and, at the back contact of this armature, completes a circuit extending from ground by way of the said armature and its back contact, the armature 139 and its front contact, the off-normal springs 135 and 136, through the winding of the slow releasing relay 129 and through the winding of the vertical magnet 140 to the battery. The vertical magnet 140 operates to raise the switch shaft, carrying the switch wiper 160, opposite the first level of bank contacts.

Upon the first vertical step of the switch shaft, the off-normal springs are shifted and another circuit is prepared for the vertical magnet 140 which extends through the off-normal springs 135 and 137 and the armature 134 and its front contact, the relay 129 being energized in series with the vertical magnet 140.

In the code-sending switch CD, the operation of the magnet 250, in addition to opening the circuit of the repeating relay 201, also opens the circuit of the slow releasing relay 249. After a short interval, the relay 249 is deenergized and opens the circuit of the stepping magnet 250 at the armature 276. The magnet 250, upon being deenergized, advances the wipers 280 to 283, inclusive, into engagement with the second set of bank contacts. The deenergization of the magnet 250 closes the circuit of the repeating relay 201 and the slow releasing relay 249. The slow releasing relay 249 energizes to again close the circuit of the stepping magnet 250, which operates to open the circuit of the relays 249 and 201. The alternate operation of the stepping magnet 250 and the slow releasing interrupter relay 249 continues until the switch wipers 280 to 283, inclusive, are stepped into engagement with the set of bank contacts corresponding, in the banks of the code-sending switch CD, to the bank contacts in the finder switch F with which the wipers of the finder are in engagement.

When the wipers of the code-sending switch are brought into engagement with this set of bank contacts, which, it will be assumed, are the bank contacts 296 to 299, inclusive, a circuit is completed which extends from ground by way of the armature 463 and its front contact, the front contact and the armature 461, the common conductor 302, the wiper 222, the bank contact 226, the bank contact 297, the wiper 281, and through the winding of the relay 202 to battery. Upon being energized, the relay 202 at its armature 206 opens the circuit of the stepping magnet 250 of the code-sending switch CD, opens the circuit of the slow releasing relay 247 at the armature 207, closes a locking circuit for itself at its armature 208 and its front contact, and at the armature 209 closes a circuit for the line relay 201 exclusive of the armature 257 on the slow releasing relay 241. The locking circuit is completed from ground through battery, winding of relay 202, back contact and armature 275, front contact and armature 208 and front contact and armature 256 to ground.

It will be noted that the repeating relay 201 is deenergized each time the stepping magnet 250 is energized. Consequently, the circuit of the line relay 131 of the connector H is interrupted a like number of times. The retractions of the armature 150 bring about a plurality of energizations of the vertical magnet 140 over the previously traced circuit. The maximum number of these vertical steps is ten. The vertical magnet 140 operates to raise the switch shaft, carrying the switch wiper 160 to the proper level of bank contacts. The slow releasing relay 129 is maintained energized throughout the vertical movement of the switch, thus keeping the vertical magnet circuit intact at its armature 134. A short interval after the termination of the vertical operation of the switch, the slow releasing relay 129 deenergizes. The deenergization of this relay prepares a circuit for the rotary magnet 141.

It will be recalled that the circuit of the slow releasing relay 247 was opened by the operation of the relay 202. The relay 247 retracts its armature and opens the circuit of the slow releasing relay 246. Upon being deenergized, the relay 246, at armature 273, opens the circuit of the relay 245. A circuit is now closed which extends from ground by way of the armature 269 and its back contact, through the winding of the stepping magnet 250, the back contact and the armature 270, the bank contact with which the wiper 283 is in engagement and the said wiper, and thence to battery by way of the back contact and the armature 271. As the circuit of the stepping magnet is completed through its own contacts, comprising the armature 271 and its back contact, the stepping magnet operates as a buzzer to advance the switch wipers, step by step, until the wipers are brought into engagement with the thirteenth set of contacts in the bank. In this position, the circuit of the stepping magnet 250 is opened, the wiper 283 being in engagement with bank contact 292. A circuit is now completed extending from battery by way of the armature 271 and its back contact, the wiper 283, the bank contact 292, and through the winding of the relay 248 to ground. Upon operating, the relay 248, at its armature 275, opens the locking circuit of the relay 202. The relay 202 is deenergized to prepare another circuit for the magnet 250 at the back contact of the armature 206, to close the circuit of the slow releasing relay 247 at the armature 207 and to close a circuit for the relay 245 at the armature 208.

Another result of the deenergization of the relay 202 is that at the armature 209 the circuit of the repeating relay 201 is again placed under the control of the stepping magnet 250. It may be stated at this point that, while the circuit of the slow releasing relay 249 is interrupted by the operation of the stepping magnet 250, the relay 249 maintains its armature attracted, by reason of its slow releasing character.

As the circuit of the relay 247 is closed, this relay energizes to close the circuit of the slow releasing relay 246. The relay 246 operates, in the same manner as before, to close an additional circuit for the relay 245 at its armature 273 and to close another stepping circuit for the stepping magnet 250. The operation of the stepping magnet 250, in advancing the wipers 280 to 283, inclusive, step by step, is controlled by the slow releasing relay 249 in a manner similar to that already described.

When the wipers of the code-sending switch CD are brought into engagement with the contact set which includes the bank contact 294, another circuit is completed for the relay 202. This circuit extends from ground by way of the armature 463 and its front contact, the front contact and armature 461, the conductor 302, the wiper 221, the bank contact 225, a conductor 303, the armature 468 and its front contact, a conductor 306, the bank contact 294, the wiper 281, and thence to battery by way of the winding of the relay 202. The operations brought about by the energization of the relay 202 are the same as before, that is, the deenergization of the relay 247, the momentary stopping of the code-sending switch CD and the transfer of the circuit for the repeating relay 201 so that it is not affected by the operation of the magnet 250.

During the preceding operation of the code-sending switch CD, a series of interruptions is produced in the circuit of the repeating relay 201. The operation of this relay serves to repeat the interruptions to the circuit of the line relay 131 of the connector H in the control office.

The vibration of the armature 150 of the line relay 131 alternately closes and opens the circuit of the rotary magnet 141. The rotary magnet 141 operates to rotate the switch shaft bringing wiper 160 into engagement with the proper bank contact in the selected level, which, it will be assumed, is the bank contact 170. The slow releasing relay 128 is energized over a circuit in multiple with the rotary magnet 141 and operates, at its armature 133, to remove ground from the wiper 160 during the rotary movement of the switch.

A short interval after the cessation of the rotary operation, the slow releasing relay 128 is deenergized and a circuit is closed extending from ground by way of the armature 145 and its front contact, the armature 133 and its back contact, the wiper 160, the bank contact 170, through the winding of the relay 103 and through the resistor 104 to the battery. The relay 103 is energized over this circuit and operates at armature 117 to establish a locking circuit for itself, to open the circuit of the lamp 107 at armature 116, and at the front contact of this armature to complete a circuit for the lamp 106. The effacement of the lamp 107 and the lighting of the lamp 106 apprises the dispatcher that the contactor 416 has been operated to start the operation of the converter RC.

In the code-sending switch CD, the deenergization of the relays 247, 246 and 245 causes the stepping magnet 250 to be intermittently operated to advance the wipers 280 to 283, inclusive. When the wipers are brought into engagement with the twenty-fifth set of bank contacts, the circuit of the relay 242 is opened at the wiper 280 and this relay is deenergized. Upon retracting its armature 260, the relay 242 opens the circuit of the slow releasing relay 240. After a short interval the relay 240 retracts its armatures and, among other results, opens the circuit of the slow releasing relay 241 at armature 254. The deenergization of the slow releasing relay 240 also prepares a circuit through the relay 203 at the armature 255. Another result of the switch wipers of the code-sending switch CD being brought into engagement with the twenty-fifth set of bank contacts is that a circuit is completed extending from ground by way of wiper 280, bank contact 285, and through the winding of the relay 244 to battery. Upon being energized, the relay 244 at the armature 267 completes the previously traced circuit for the relay 203.

The relay 203, upon energizing, opens another point in the circuit of the relay 242 at armature 212, and at the armature 210 closes a circuit which extends as follows: from ground by way of armature 210 and its front contact, the wiper 220, the bank contact 224, the conductor 301, through the resistor 465 to battery. This circuit serves to shunt out the relays 409 and 410 and these relays become deenergized. The deenergization of the relays 409 and 410 opens the circuit of the relay 243 in the code-selecting switch CD at the armatures 466 and 467, and at the armatures 461 and 463 ground is removed from the circuit for the stepping magnet 204, and from the wipers 221 and 222.

As the circuit of the repeating relay 201 is now open, the relay 243 is deenergized, the relay 201 deenergizes and opens the circuit of the line relay 131 of the connector H in the control office.

The retraction of the armature 150 on the line relay 131 opens the circuit of the slow releasing relay 130, and the relay 130 is deenergized. As a result of the deenergization of the relay 130, ground is removed from the wiper 160 at armature 145, and a circuit is completed at armature 139, which extends from ground by way of the armature 150 and its back contact, the armature 139 and its back contact, the off-normal spring 138 and its working contact, through the winding of the release magnet 142, and thence to the battery. The release magnet 142 operates to withdraw the retaining double dog from the switch shaft in the usual manner. When the switch shaft reaches its normal position, the off-normal springs are separated and the circuit of the release magnet 142 is opened by the movement of the spring 138 from engagement with its working contact. In the above manner, the connector switch H is released consequent to the completion of the code-sending operation.

When the connector switch H releases, the original energizing circuit of the relay 103 is opened, but this relay does not deenergize, due to the fact that it establishes a locking circuit for itself.

At the code selecting switch CD, the slow releasing relay 241, upon being deenergized, opens the locking circuit of the relay 202 at the armature 256 and opens one part of the circuit of the repeating relay 201 at the armature 257, and at the armature 296 completes a circuit which extends from ground by way of the back contact and armature 269, through the winding of the stepping magnet 250, the back contact and armature 270, the armature 296 and its back contact, the bank contact 295, the wiper 283, and thence to the battery, by way of the back contact and armature 271. The stepping magnet 250 is operated over this circuit and advances the wipers 280 to 283, inclusive, to their first and normal position.

As the circuit for the relay 202 is opened by the retraction of the armature 256 of relay 241, this relay becomes deenergized. By its restoration to normal, certain circuits of the switches F and CD are prepared for reoperation. Other results of the deenergization of relay 243, its circuit being opened by the deenergization of the relays 409 and 410, previously described, are the opening of the circuit of the slow releasing relay 249 at the armature 262, and the restoration at the armatures 261, 262 and 263 of certain circuits to their normal conditions.

When the wipers of the code-sending switch CD are rotated to their first position, the circuit of the relay 244 is opened and this relay is deenergized to open the circuit of the relay 203. The deenergization of the latter relay opens the short-circuit around the relays 409 and 410 of the relay group RG—1. As the contactor 416 is in operated position, the relay 411 is still energized and a circuit is effected for energizing the relay 410. This relay operates to establish a locking circuit for itself at the armature 462. The operation of this relay is without function at the present time for the reason that the relay 409 is not also energized.

When there is any change in the position of the contactor 416, the relay 411 is deenergized and the relay 409 is operated in addition to the relay 410. By the conjoint action of the relays 409 and 410 (relay 411 being now deenergized), the finder switch F and the code-sending switch CD function in a manner similar to that already described, to control the operation of the connector switch H in the control office. The connector switch H is stepped vertically to the proper level of bank contacts and is then rotated to engage a bank contact, such as the contact 169. As a result of the operation, the relay 103 is short-circuited and deenergized. The deenergization of the relay 103 opens the circuit of the lamp 106 and closes the circuit for the lamp 107. By the change in the lamp signals, the dispatcher is apprised of the change in position of the contactor 416.

Each of the contacts of the switch wipers 220 and 221 is connected to armatures of relays similar to 409 and 410 which, in turn, are individual to apparatus units. When any one apparatus unit operates, its individual relays, such as 409 and 410, are operated. If the unit is operated from an opened to a closed position, its relay equivalent to relay 411 is energized. If the unit is operated from a closed to an opened position, its relay equivalent to relay 411 is deenergized. The armature equivalent to armature 468 determines whether the line 305 or 306 will be closed and thus determines the final combination of impulses.

The contacts of the finder switch associated with the wiper 222 are connected to different points on the switch of wiper 281. This gives the first combination of ten impulses. A plurality of these contacts may be connected to the same contact on the sender switch of wiper 281, since the combination in each case can be made different by making the second connection of this finder contact different on the code sender for each of these. Thus, for example, if, in addition to the contact 226, several others were connected to the contact 297, these latter contacts would be connected over their individual units, equivalent to relays 409 to 411, to contacts other than 287 or 294.

In a like manner, when one of the other apparatus units in the substation change their condition, the load dispatcher receives a signal indicative of the changed condition.

A special feature of the invention resides in the provision of the relays 500, 501 and 502, which are provided for indicating the voltage drop across the main busses 483 and 484. These relays, being marginal relays, will respond to the different voltages to start the supervisory operations. The signalling lamps individual to these relays are arranged to indicate predetermined voltages. Thus when one of these relays operates to light its individual lamp, a predetermined voltage is indicated, corresponding to the voltage at which the relays operated.

The relays 500, 501 and 502 may be designed to operate respectively, when the voltage of the circuit 483—484 varies from 500 to 700 volts. The relay 500 may, for example, be designed to operate when the voltage of the circuit to which it is connected is between 500 and 575 volts, the relay 501, when the voltage is between 575 and 625 volts, and the relay 502 when the voltage is between 625 and 700 volts. It will be observed that the relays 500, 501 and 502 will thus give an approximate indication of the voltage of the circuit 483—484 at the control station. When the circuit voltage changes from one of the ranges mentioned, the corresponding signal lamp is illuminated. Thus the lamp operated by the last received code is illuminated to indicate to the operator the voltage at the substation at that instant.

It will now be assumed that the dispatcher desires to start the rotary converter RC in the substation shown. To accomplish this result, the dispatcher operates the key K, which associates the calling device S with the trunk line leading to the substation. By the operation of the key K, a circuit is completed over the trunk conductors 190 and 191 and the conductors 307 and 308 in series for the line relay 310 of the connector switch H—1 in the desired substation.

The line relay 310, upon operating, closes a circuit at its armature 320 for the slow releasing relay 311. The relay 311, upon attracting its armatures, places ground upon the wiper 350 at armature 322 and, at armature 321, opens one point in the circuit of the release magnet 318 and, at the front contact of this armature, prepares the impulsing circuits.

The dispatcher will now operate his calling device S in accordance with the two digits which constitute the code for operating the contactor 416. When the calling device is operated in accordance with the first digit, a series of interruptions is produced in the circuit of the line relay 310 of the connector H—1, and this relay retracts its armature a corresponding number of times to control the operation of the vertical magnet 325 in raising the switch shaft, carrying the switch wiper 350, to the desired level of bank contacts. The relay 312 is maintained energized throughout the vertical operation of the switch and operates, as before, to maintain the circuit of the vertical magnet intact after the off-normal springs are shifted. A short time after the cessation of impulses to the vertical magnet, the slow releasing relay 312 retracts its armature 323, whereby a circuit is prepared for the rotary magnet 314.

When the dispatcher operates his calling device in accordance with the next digit of the code number, the circuit of the relay 310 is opened a plurality of times and this relay retracts its armature to send a like number of impulses to the rotary magnet 314. The rotary magnet 314 operates to rotate the switch shaft, carrying the switch wiper 350, into engagement with the proper bank contact in the selected level, which, it will be assumed, is the bank contact 354. The slow releasing relay 313 is energized over a circuit in multiple with that of the rotary magnet and maintains its armature 324 in an operated position during the rotary operation of the switch. A short interval thereafter, the relay 313 deenergizes and places ground upon the wiper 350.

The grounding of the wiper 350 places ground on the conductor 550 which extends through the relay 414 of Fig. 4. The energization of the relay 414 closes a circuit for the contactor 416. Another result of the operation of the relay 414 is that it establishes a locking circuit for itself at armature 473. The relay 414, in addition to closing the circuit of the contactor 416, initiates the operation of various other devices in a manner similar to relay 415, before described, to bring the rotary converter RC into operation.

By the operation of the contactor 416, a circuit is closed for the relay 411 of the relay group RG—1. The code-sending apparatus now functions in the same manner as before described to change the supervisory signals at the dispatcher's office, thus notifying him of the completed operation.

The dispatcher may now restore the key K to normal. As a result of this operation, the circuit of the line relay 310 of the connector H—1 in the substation is opened and this relay is deenergized. Upon retracting its armature 320, the circuit of the slow releasing relay 311 is opened. The relay 311 deenergizes after an interval to bring about the release of the connector H—1 in a manner similar to that described in connection with the connector H (Fig. 1) previously described.

It will be noted that when the relay 414 operates, it so locks itself closed through its armature 473 that the automatic control of the rotary converter RC is rendered ineffective and the converter placed under the absolute control of the dispatcher.

When the dispatcher desires to stop the operation of the rotary converter RC, he throws the key K and operates the calling device S for the digits constituting the proper code. By these operations, the connector switch H—1 is operated and its wiper 350 placed in engagement with the proper bank contact. As a result of this operation, the relay 413, in Fig. 4, is energized and the locking circuit of the relay 414 is opened. The relay 413 establishes a locking circuit for itself at the armature 472 and opens the circuit of the contactor 416 at the armature 474. The rotary converter RC is now stopped and locked out, that is, the automatic controlling apparatus in the substation cannot operate to start the converter, it being still under the control of the dispatcher.

To again place the rotary converter RC under control of its automatic controlling equipment, the dispatcher sends another code of impulses, whereby the relay 412 is operated. The operation of this relay opens the locking circuit of the relay 413, which is deenergized. The deenergization of the relay 413 restores the control circuit to normal.

The relays 490', 491' and 492 of Fig. 4 are provided for the purpose of controlling the operation of the contactor 406. These relays function in a similar manner with the relays 412, 413 and 414, the operations of which have been previously described.

In a manner similar to that above described, the dispatcher may control the operation of the various contactors, such as 404 to 408, inclusive, and any other apparatus in the substation to effect any desired result to take care of emergency conditions in the substation.

The dispatcher may also communicate with any lineman or other party that may be at the substation by associating his telephone by means of a key (not shown) with the trunk line extending to the substation and operating the hand generator on his telephone. By this operation, the substation is signalled. As the local telephones are connected to the trunk line extending between the control office and to the substation by a capacity coupling and impedance coils are connected in line, conversation may take place at the same time that signals are being sent in either direction.

It will be apparent that signals may be sent in either direction over the three-conductor trunk line comprising conductors 190 to 192, inclusive, without interference, the conductor 191 being used as a common return in a well known manner.

It will be seen that the present invention provides an automatic substation system having all the advantages of automatic control but having none of its disadvantages, due to the fact that a dispatcher at a central point is able to supervise and control the equipment in the various substations of the system.

My invention is not limited to the specific details illustrated as it may be variously modified without departing from the spirit and scope of my invention, as set forth in the appended claims.

I claim as my invention:

1. In a supervisory control system, a first station, a remotely disposed station, apparatus units at said remote station, means for operating said units automatically, supervisory signals at said first station individual to each of said apparatus units, an automatic switch at said remote station, a set of wipers and cooperating bank contacts for said switch, connections from said apparatus units to individual contacts on said switch, means responsive to the operation of one of said apparatus units for operating said switch to associate said switch wipers with the bank contacts cooperating with the apparatus units operated, a trunk line extending from said remote station to said first station, a second switch comprising a set of wipers and cooperating bank contacts, means including circuit connections from said first switch to said second switch whereby said first switch controls the movement of said second switch, means responsive to the movement of said second switch for transmitting a code combination of impulses individual to the position of said first switch over said trunk line and means at said first station responsive to said impulses for selectively operating the supervisory signal individual to the apparatus which has operated.

2. In a supervisory control system, a first station, a remote station, apparatus units at said remote station, means for operating said units automatically, devices individual thereto at said first station, normally non-operating means including a stepping finder switch, means whereby said finder switch is started into operation in response to an operation of one of said apparatus units for selecting said apparatus unit, a rotary code-transmitting switch controlled by said last mentioned means for transmitting a code combination of impulses individual to said operated apparatus unit, including a stepping selector and means at said first station responsive to said code combination of impulses for operating said device individual to said apparatus unit.

3. In a supervisory control system, a first station, a second station, apparatus units at said second station, means for operating said units automatically, signalling devices individual thereto at said first station, a finder switch, normally in a non-operating condition, means responsive to the operation of one of said apparatus units for starting said finder switch into operation to assume a position individual to said operated apparatus unit, a code transmitter and means including circuit connections from said finder switch to said code transmitter for operating said code transmitter in accordance with the position assumed by said finder switch, a signaling line connecting the stations, means responsive to the operation of said code transmitter for transmitting code combinations of impulses over said signalling line individual to said operated apparatus unit, and means responsive to said code combination of impulses for operating one of said signalling devices individual to said apparatus unit.

4. In a supervisory control system, a first station, a remote station, apparatus units at said remote station, means for operating said units automatically, signalling devices individual to said units at said first station, means whereby a plurality of said apparatus units may be operated simultaneously, a normally non-operating means, means for starting said normally non-operating means into operation in response to the operation of one or more of said apparatus units, said means being arranged to assume positions individual to said apparatus units in a predetermined sequence, a code transmitter, means whereby said code transmitter is operated in accordance with the position of said last mentioned means, means responsive to the operation of said code transmitter for transmitting code combinations of impulses to said first station, and means at said first station responsive to said code combination of impulses for operating said signalling devices individual to said operated apparatus unit.

5. In a supervisory control system comprising a first station, a second station, apparatus units at said first station, signalling devices at said second station and a line connecting said stations, the combination with a measuring device, of a normally inoperative finder switch and code-impulse transmitter for impressing impulses on said line, means whereby said apparatus units, on a change in condition, control said finder switch, means whereby said finder operates the impulse transmitter for impressing impulses on said line individual to said units, means whereby said measuring device controls said finder switch, means whereby said units and measuring device obtain control of said code transmitter in a sequence determined by the finder switch, and means whereby said signalling devices respond to said impulses.

In testimony whereof, I have hereunto subscribed my name this 14th day of April, 1923.

ROY J. WENSLEY.